United States Patent
Thompson et al.

(10) Patent No.: US 11,412,085 B2
(45) Date of Patent: Aug. 9, 2022

(54) SPOOF CALL DETECTION IN TELEPHONE NETWORK

(71) Applicant: BRITISH TELECOMMUNICATIONS PUBLIC LIMITED COMPANY, London (GB)

(72) Inventors: Simon Thompson, London (GB); Robert Claxton, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/593,737

(22) PCT Filed: Mar. 17, 2020

(86) PCT No.: PCT/EP2020/057213
§ 371 (c)(1),
(2) Date: Sep. 23, 2021

(87) PCT Pub. No.: WO2020/193271
PCT Pub. Date: Oct. 1, 2020

(65) Prior Publication Data
US 2022/0094786 A1 Mar. 24, 2022

(30) Foreign Application Priority Data
Mar. 28, 2019 (EP) .................................. 19165765

(51) Int. Cl.
*H04M 3/436* (2006.01)
*H04L 9/40* (2022.01)
(Continued)

(52) U.S. Cl.
CPC ........ *H04M 3/436* (2013.01); *H04L 63/1483* (2013.01); *H04M 3/2281* (2013.01); *H04M 3/42059* (2013.01); *H04M 2203/6027* (2013.01)

(58) Field of Classification Search
CPC ............... H04M 3/436; H04M 3/2281; H04M 3/42059; H04M 2203/6027; H04L 63/1483
See application file for complete search history.

(56) References Cited

U.S. PATENT DOCUMENTS 5,157,712 A 10/1992 Wallen, Jr.
6,990,187 B2 1/2006 MacNamara et al.
(Continued)

FOREIGN PATENT DOCUMENTS

EP 0 229 170 7/1987

OTHER PUBLICATIONS

International Search Report for PCT/EP2020/057213 dated Jul. 13, 2020, 4 pages.
(Continued)

*Primary Examiner* — Wayne H Cai
(74) *Attorney, Agent, or Firm* — Nixon & Vanderhye P.C.

(57) ABSTRACT

Computer-implemented methods of placing and processing calls in a communications network are provided. The computer-implemented method of processing calls in a telephone network comprises: identifying a plurality of calls that have been made by a particular telephone number to telephone numbers in the telephone network; determining whether a sequence in which the calls were placed corresponds to a correct order for calling those telephone numbers, the correct order being determined based on a predetermined order for calling telephone numbers in the telephone network; and determining that one or more of the
(Continued)

calls were made by spoofing the particular telephone number if the sequence in which the calls were placed does not correspond to a correct order.

20 Claims, 5 Drawing Sheets

(51) Int. Cl.
*H04M 3/22* (2006.01)
*H04M 3/42* (2006.01)

(56) References Cited

U.S. PATENT DOCUMENTS

| | | | |
|---|---|---|---|
| 9,060,057 | B1 | 6/2015 | Danis |
| 10,601,986 | B1 * | 3/2020 | Botner ............. H04M 3/42068 |
| 2003/0185361 | A1 | 10/2003 | Edwards |
| 2006/0135168 | A1 | 6/2006 | Cai et al. |
| 2009/0217039 | A1 | 8/2009 | Kurapati et al. |
| 2012/0213082 | A1 | 8/2012 | Carney et al. |
| 2015/0026786 | A1 | 1/2015 | Alexander |
| 2015/0249737 | A1 | 9/2015 | Spievak et al. |
| 2017/0310821 | A1 | 10/2017 | Cook |
| 2018/0249005 | A1 | 8/2018 | Dowlatkhah et al. |
| 2020/0162610 | A1 * | 5/2020 | VanBlon ............. H04M 3/4365 |

OTHER PUBLICATIONS

Written Opinion of the ISA for PCT/EP2020/057213 dated Jul. 13, 2020, 5 pages.
Combined Search and Examination Report for GB 1904296.9 dated Sep. 30, 2019, 7 pages.
Examination Report for GB1904296.9 dated Aug. 17, 2021, 4 pages.
Search Report for EP19165765.9 dated Aug. 27, 2019, 6 pages.
Wikipedia—Blind Signature, last edited Feb. 4, 2019, 4 pages.
Miramirkhani et al., "Dial One for Scam: A Large-Scale Analysis of Technical Support Scams", arXiv:1607.06891v3 [cs.CR], Mar. 19, 2017, 15 pages.
Pandit et al., "Towards Measuring the Effectiveness of Telephony Blacklists", *Network and Distributed Systems Security* (*NDSS*) *Symposium 2018*, Feb. 18-21, 2018, 15 pages.
Mandhani et al., "Watermarking using Decimal Sequences", *Cryptologia*, vol. 29, Jan. 2005, pp. 50-58.
International Preliminary Report on Patentability for PCT/EP2020/057213 dated Oct. 7, 2021 (7 pages).

* cited by examiner

SPOOF CALL DETECTION IN TELEPHONE NETWORK

This application is the U.S. national phase of International Application No. PCT/EP2020/057213 filed Mar. 17, 2020 which designated the U.S. and claims priority to EP Patent Application No. 19165765.9 filed Mar. 28, 2019, the entire contents of each of which are hereby incorporated by reference.

FIELD OF THE INVENTION

The present invention relates to placing and processing calls in a telephone network. In particular, the present invention relates to methods of placing and processing calls such that telephone number spoofing can be detected.

BACKGROUND TO THE INVENTION

A call placed in a telephone network typically includes information regarding the originating number (or network number), a separate caller identifier number (otherwise referred to as the caller ID or presentation number) and the number being called (otherwise referred to as the destination number). Caller ID spoofing is the practice of causing a telephone network to indicate to the receiver of a telephone call that the number from which an originator of the call is calling is different from their true originating number. A call in which the Caller Identifier Number reflects a different number (the spoofed number) from the true originating number may be referred to as a spoofed call. Under ideal conditions, an operator of a telephone network should be able to distinguish calls where the Caller ID has been altered by checking whether it matches the originating number information for the call. However, in a deregulated world, with many operators, each having different practices and providing varying level of assurance on the validity of an originating number or Caller ID, it can be hard for a network operator to ensure that a specified originating number (as well as other fields in the signalling for a call) is correct, especially where calls originate from a different network. This issue is amplified by the advent of IP telephony. It can therefore be hard to identify calls where Caller ID spoofing is occurring.

Whilst there are various legitimate uses of Caller ID spoofing, it is increasingly being used for nefarious purposes. For example, various techniques for blocking calls (such as by blacklisting or whitelisting numbers) from undesirable callers are known. However, Caller ID spoofing may be used as part of an attempt to circumvent such blocking systems by making the calls appear to come from a number belonging to a reputable company whose calls would not be blocked. Another use of Caller ID spoofing is as part of fraudulent social engineering techniques designed to convince the called party that the caller is from the reputable company whose number is being spoofed in order to convince them to carry out actions or divulge confidential information that they would not otherwise do. Since fraudsters carrying out this kind of activity also typically make use of automated calling in order to reach their victims, spoofing the Caller ID of a reputable company may also help them avoid attempts to block unwanted automated calls. In other situations, a more malicious entity might spoof the Caller ID's of vital organisations, such as hospitals, the police, banks and so on in order to fill the network with deceptive calls resulting in a denial of service.

SUMMARY OF THE INVENTION

It is therefore desirable to provide a mechanism for providing assurance that a series of calls are likely to have come from a genuine source (such as the owner or authorised user of a telephone number) or that indicates that spoof calls are likely being made that provide the illusion of coming from that source.

According to a first aspect of the invention, there is provided a computer-implemented method of processing calls in a telephone network, the method comprising: identifying a plurality of calls that have been made by a particular telephone number to telephone numbers in the telephone network; determining whether a sequence in which the calls were placed corresponds to a correct order for calling those telephone numbers, the correct order being determined based on a predetermined order for calling telephone numbers in the telephone network; and determining that one or more of the calls were made by spoofing the particular telephone number if the sequence in which the calls were placed does not correspond to a correct order.

Through the use of a predetermined order for calling telephone numbers, which is known and adhered to by the owner of a telephone number, the presence of spoofed calls being placed using that telephone number can be detected.

The method may further comprise: identifying a largest subset of the plurality of calls for which a sequence in which the subset of calls was placed corresponds to a correct order for calling those telephone numbers; and classifying any calls belonging to the largest subset as being legitimate calls and any calls not belonging to the largest subset as being spoofed calls.

Through the identification of the largest subset of calls that are in a correct order, the spoofed calls that have been made can be identified.

The may further comprise: identifying the latest legitimate call; and classifying a further call made by the particular telephone number as a spoofed call if a telephone number that is called is earlier in the predetermined order than a telephone number of the latest legitimate call. The method may block further calls in response to classifying the further call as a spoofed call.

Through the identification of the latest legitimate call, at least some subsequent spoofed calls can be identified as they are being placed, enabling appropriate action to block or screen those calls to be taken, whilst the probability of accidentally affecting any subsequent genuine calls is low.

The method may share a secret with a party that is authorised to use the particular telephone number, the secret determining the predetermined order for calling a set of telephone numbers. The secret may be received from the party or provided to the party that is authorised to use the particular telephone number. The secret may comprise an operation that produces a numerical value from a telephone number, the predetermined order may be based on the respective numerical values produced by the operation for each of the called telephone numbers. The predetermined order may be generated by placing the respective numerical values for each of the called telephone numbers in either ascending or descending order. The secret may comprise a cipher or a hashing function.

The method further may further comprise causing one or more predetermined actions to be taken in response to determining that one or more of the calls were made by spoofing the particular telephone number. The one or more predetermined actions may comprise notifying the party which is authorised to use the particular telephone number that calls are being made by spoofing that telephone number.

According to a second aspect of the invention, there is provided a computer-implemented method of placing calls in a communications network, the method comprising: sharing a secret with the communications network, the secret determining a predetermined order for calling a set of telephone numbers; using the secret to determine an order for a plurality of telephone numbers to be called; calling the plurality of telephone numbers in sequence according to the determined order.

According to a third aspect of the invention, there is provided a computer system comprising a processor and a memory storing computer program code for performing the methods set out above.

According to a fourth aspect of the invention, there is provided a computer program which, when executed by one or more processors, is arranged to carry out the methods set out above.

BRIEF DESCRIPTION OF THE FIGURES

Embodiments of the present invention will now be described by way of example only, with reference to the accompanying drawings, in which.

DETAILED DESCRIPTION OF EMBODIMENTS

Figure 1:
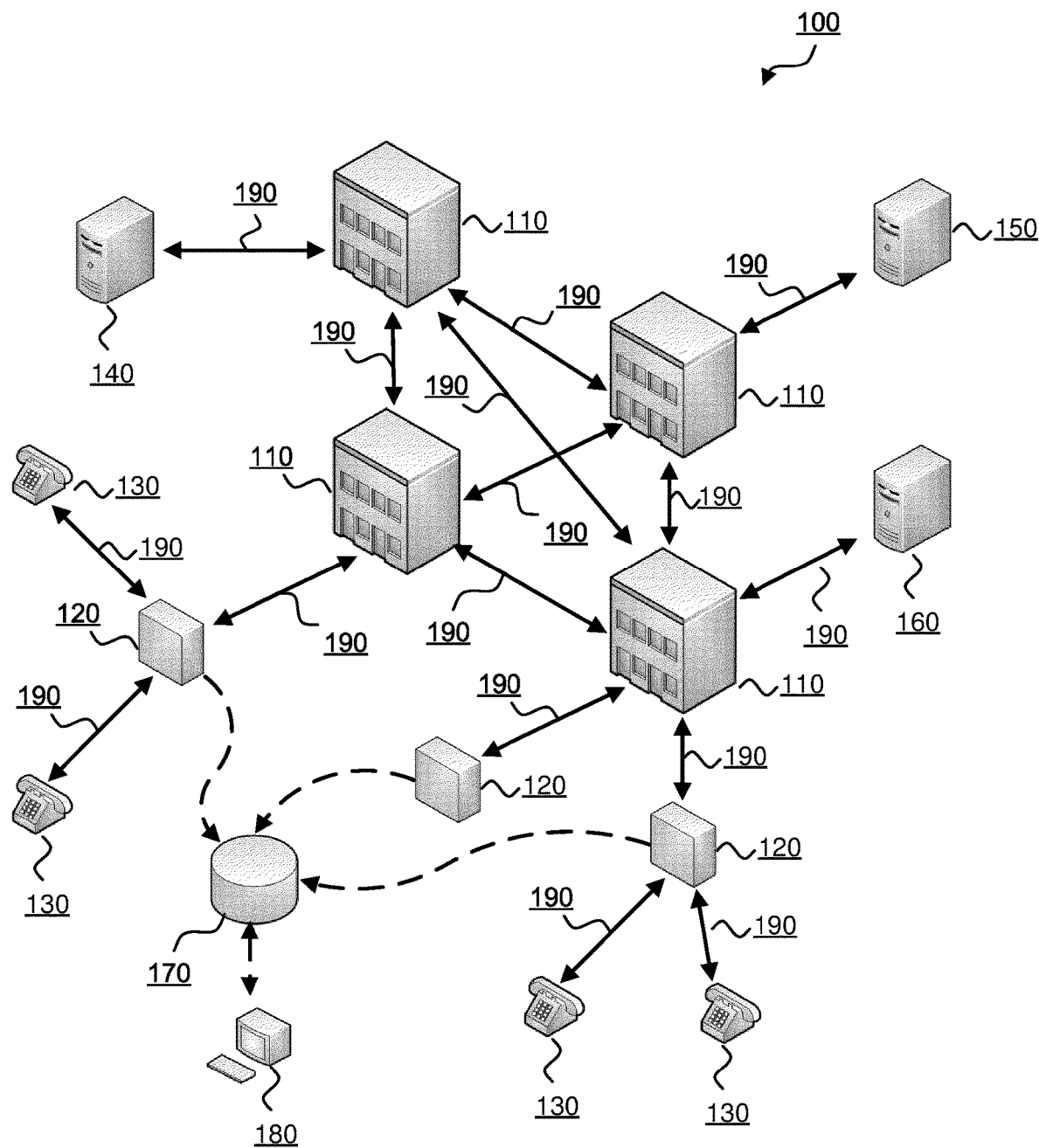
FIG. 1 schematically illustrates an exemplary telephone network within which embodiments of the invention may operate.

FIG. 1 is a schematic depiction of an exemplary telephone network 100 within which embodiments of the invention may operate. The exemplary telephone network 100 may also be referred to as a communications network. The exemplary telephone network 100 is a conventional telephone network comprising a plurality of core exchanges 110, a plurality of local exchanges 120, a plurality of customer telephony terminals 130, one or more domestic gateways 140, one or more international gateways 150, one or more voicemail servers 160, one or more call data stores 170 and one or more analyst terminals 180.

The core exchanges 110 are interconnected by a plurality of communications links 190. Each of the plurality of core exchanges 110 are further connected to one or more local exchanges by further communications links 190 (although, for the sake of clarity, not all of the core exchanges 110 illustrated in FIG. 1 are shown as being connected to local exchanges 120).

The local exchanges 120 are each connected to a respective core exchange 110 via a respective communication link 190. Each of the local exchanges 120 is also connected to a respective subset of the customer telephony terminals 130 via yet further communications links 190 (although again, for the sake of clarity, this is not shown for each of the local exchanges 120 in FIG. 1).

The customer telephony terminals 130 are each connected to a respective local exchange 120 via a respective communication link 190. The customer telephony terminals 130 can include devices such as telephones, private branch exchanges (PBX), conference phones, computer diallers, fax machines, modems, answering machines and so on.

The domestic gateways 140 are each connected to one or more other telephony networks (not shown) in the same country. The domestic gateways 140 enable calls to be routed between the telephone network 100 and the other telephony networks. That is to say, the domestic gateways 140 enable the customer telephony terminals 130 within the telephone network 100 to place calls to and/or receive calls from telephony terminals within the other telephony networks.

The international gateways 150 are each connected to one or more other international telephony networks (not shown). The international gateways 150 enable calls to be routed between the telephone network 100 and the other international telephony networks. That is to say, the international gateways 150 enable the customer telephony terminals 130 within the telephone network 100 to place calls to and/or receive calls from telephony terminals within the other international telephony networks.

The voicemail servers 160 are connected to the telephone network 100 via respective communications links 190. They may be connected at any point in the telephone network 100, such as at core exchange 110 as shown in FIG. 1. Although not illustrated in FIG. 1, voicemail servers 160 may also or alternatively be connected to a local exchange 120. Each of the voicemail servers 160 provides a voicemail facility to a plurality of customers of the telephone network 100. For example, a voicemail server 160 connected to a local exchange 120 might provide a voicemail facility for the customers whose telephony terminals 130 are directly connected to that local exchange 120. Of course it will be appreciated that a multitude of other arrangements are possible.

The call data stores 170 each store a plurality of call data records representing some or all of the telephony calls made over the telephone network 100 for a given period of time. Each call data record will comprise the telephone number used by the calling party, the telephone number of the called party, the time that the call started and the time that the call was terminated (or a time that the call started or ended and a duration of the call). The call data is provided periodically to the data stores by the one or more local exchanges 120 (and/or, in some embodiments, by the core exchanges 110) as calls are placed, connected and terminated in the telephone network 100. The provision of the call data is provided to the data stores 170 using any appropriate means of communication, such as by using a data network that is separate from the telephone network 100. As will be appreciated, each data store, may receive data from different sets of local exchanges 170, such that call data for the network 100 as a whole is spread across the data stores 170.

The analyst terminals 180 are computer systems which can access the data stored in the data stores 170 (or, at least, in some of the data stores 170). Programs may run on the analyst terminals 180 to analyse the call data stored in the data stores 170 including, for example, to classify whether particular callers are a source of automated telephone calls, in accordance with embodiments of this invention.

As is well known, calls made by a customer telephony terminal 130 are initially handled by the local exchange 120 to which the terminal 130 is connected via its respective communication link 190. If the destination of the call is another terminal 130 that is connected to the same local exchange 120, that local exchange 120 can route the call directly to its destination without involving any of the other components of the telephone network 100. Otherwise, if the destination terminal 130 is not on the same local exchange 120, the local exchange 120 routes the call to the respective core exchange 110 to which it is connected to handle the further routing of the call. If the call is destined for another terminal 130 on the network, the core exchange 110 routes the call, possibly via one of the other core exchanges 110, to the local exchange 120 to which that terminal 130 is connected. However, if the call is destined for a terminal on another network, the core exchange 110 routes the call to one of the gateways for onward routing to that network. In some cases, instead of routing a call to a customer's telephony terminal 130, the telephone network 100 can instead route a call to one of the voicemail servers 160 which provides a voicemail facility for that customer. The caller can then leave a message which will be recorded by the voicemail server 160 and can later be replayed by the customer at a time convenient to them. If a call is routed to the voicemail a notification such as a computer or smartphone notification, an SMS message and/or an email will be sent to the customer informing them of the presence of an unheard voicemail on the voicemail server 160. The decision to route a call to one of the voicemail servers 160 may be made if, for example, there is no answer from the customer's telephony terminal 160 after a predetermined number of rings or if a customer has specified that all calls should be redirected to their voicemail.

It will be understood that the telephone network 100 illustrated in FIG. 1 is merely exemplary and that various modifications may be made according to the needs of a specific telephone network. In some embodiments, various components described above may be absent from the telephone network 100. For example, the network 100 might not include domestic gateways 140 and/or international gateways 150 if such connectivity to other networks is not required. Similarly, the telephone network 100 might not include voicemail servers 160 if no voicemail service is offered to customers of the network 100. Furthermore a wide range of other components not illustrated in FIG. 1 may be present in the telephone network 100. Indeed, in general, it will be appreciated that there are many different forms that telephone network 100 may take using different combinations, numbers, types and arrangements of these components.

Figure 2:
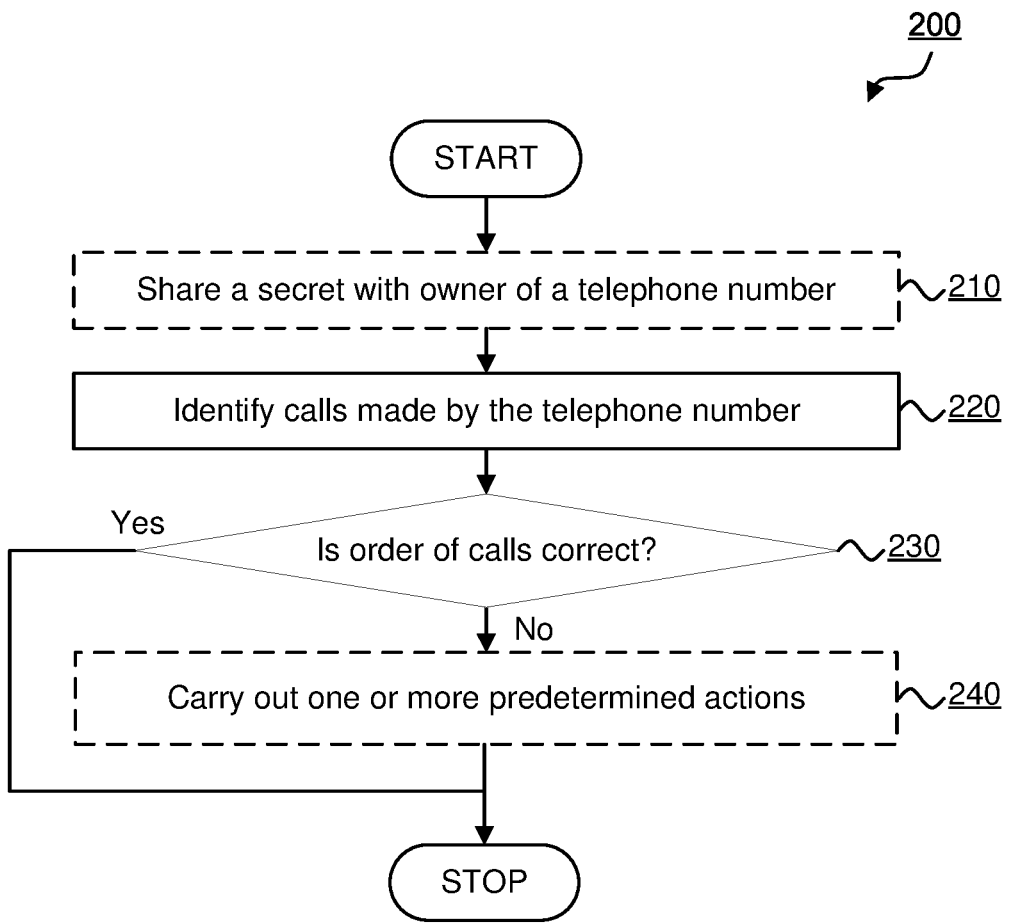
FIG. 2 is a flowchart illustrating a method of processing calls in a telephone network according to embodiments of the invention.

FIG. 2 shows a flowchart describing how a method 200 according to the present invention can be implemented to process calls in a communications network, such as the network 100 illustrated in FIG. 1. The method 200 starts at an optional operation 210.

At optional operation 210, the method 200 shares a secret with a party that is authorised to use the particular telephone number (e.g. the owner of the telephone number). The secret which is shared enables a predetermined order for calling a set of telephone numbers to be generated. In some embodiments, the secret is provided by the party that is authorised to use the telephone number (for example, the party may generate the secret and provide it to the network). In other embodiments, the secret is provided by the network (for example, the network may generate the secret and provide it to the network). Any suitable secure mechanism may be used to exchange the secret between the network and the party that is authorised to use the telephone number, as will be known by the skilled person. The secret may be an operation that produces a numerical value from a telephone number. That is to say, it is a function which takes a telephone number as an input and outputs a numerical value. The predetermined order of the telephone numbers can therefore be determined by the associated numerical values that are produced when the telephone numbers are processed by the operation, for example by using an ascending or descending order based on those values. The secret may comprise a cipher or hashing function (or any other kind of mapping from telephone numbers to another number).

As an example, a mapping may be used to map the local customer element of a telephone number (i.e. the number excluding the standard area codes and so on). This mapping could, for example, map the numbers 00-99 to a different ordering of the numbers 00-99, that is to say the number 00 might be mapped to the number 21, the number 01, might be mapped to the number 79, the number 02 might be mapped to the number 34 and so on. This mapping can then be used, for example, to map pairs of digits in the local customer element of a telephone number to a numerical value, thereby yielding a different number for each telephone number. For example, if the local customer element of a telephone number has 6 digits in the format ABCDEF, the first two digits of the telephone number AB could be mapped to a different number A'B', the second two digits of the telephone number CD could be mapped to a different number C'D' and the final two digits of the telephone number EF could be mapped to a different number E'F', thereby yielding the number A'B'C'D'E'F' for the telephone number. The same mapping could be used for each pair of numbers, or alternatively different mappings could be provided for each pair (that is a first mapping could be provided for mapping digits AB, a second mapping could be provided for mapping digits CD and a third mapping could be provided for mapping digits EF).

Of course it will be appreciated that any appropriate secret (including any suitable hashing, mapping and/or cipher functions) that enables a particular ordering of telephone numbers to be determined can be used. In another example, the secret is simply a list of telephone numbers ordered in a particular way. That is to say, a list of telephone numbers that a party wishes to call may be provided to the network and the network may return that list of telephone numbers ordered in an order that they are to be called.

Having shared a secret with the owner of a telephone number, the method 200 proceeds to an operation 220. Of course, it will be appreciated that in some embodiments, the predetermined ordering of telephone numbers could simply be widely published (such as, for example, by a network operator stating that telephone numbers should be called in numerical order (ascending or descending) of the telephone numbers themselves). In such embodiments, it is not necessary to share a secret with the owner of the telephone number and the method 200 can start with operation 220. Nonetheless, it is believed that by using a secret shared with the owner of a telephone number (at operation 210), the method 200 will be better able to detect the presence of spoofed calls for that telephone number by making it harder for a party placing spoofed calls to attempt to place calls in a correct order.

In some embodiments, the sharing of the secret at step 210, may be considered to indicate to the network 100 that the owner of the telephone number is about to start a calling campaign which they would like the network to monitor to detect any spoofed calls. In other embodiments, the owner of the telephone number may notify the network separately that the calling campaign is about to begin. Of course, it is not necessary for the network to be notified of calling campaigns in order for the invention to work, however doing so may be useful to allow resources to be allocated for the monitoring of numbers at appropriate times. However, in other embodiments, the network may monitor the calls without receiving any notification from the owner of a telephone number.

At operation 220, the method 200 identifies a plurality of calls that have been made by a particular telephone number to telephone numbers in the communications network. For example, the call data records relating to that telephone number may be retrieved from the call data stores 170. As will be appreciated, these call data records will include any calls which were made by spoofing the telephone number, as well as those that were genuinely made by the owner of the telephone number.

At operation 230, the method 200 determines whether a sequence in which the calls were placed corresponds to a correct order for calling those telephone numbers. That is to say, whether the sequence of calls is a subsequence of the predetermined order for calling the telephone numbers in the communications network. In other words, the method 200 checks each call in the sequence, to ensure that it is to a telephone number that appears later in the predetermined order than a previously called telephone number in the sequence (i.e. that the called telephone number does not appear earlier in the predetermined order than a previously called number in the sequence of calls that were made). In embodiments where a secret is shared with the owner or authorised user of the telephone number, the method 200 uses that secret at operation 230 to determine whether the sequence of calls that were made follows a correct order. For example, the method 200 may use an operation (in embodiments where the secret is an operation such as a mapping, cipher or hash) to determine the number associated with each of the called telephone numbers—these numbers can then be used to determine whether the calls were placed in a correct order (e.g. such that the numbers associated with each called telephone number are in an ascending (or descending) order).

If, at operation 230, the method 200 determines that the sequence in which the calls were placed is not correct (that is to say that it does not correspond to the predetermined order for calling the telephone numbers in the communications network), then the method 200 determines that one or more of the plurality of calls were made by spoofing the particular telephone number under consideration.

Accordingly, in some embodiments, the method 200 may proceed to an operation 240 in which it causes one or more predetermined actions to be taken in light of this determination. For example, the method 200 can notify an operator of the network and/or an owner (and/or authorised user) of the telephone number that calls are being made by spoofing that telephone number, such as by raising an alarm. The method 200 then ends.

However, If it is determined at operation 200 that the sequence in which the calls were placed is correct according to the predetermined order, then it is determined that no spoofing is taking place. Accordingly, in some embodiments, the method 200 ends. However, in other embodiments (not shown by the flowchart of FIG. 2), various predetermined actions may be taken following a determination that no spoofing is taking place, such as providing the owner of the telephone number with a positive indication that no spoofing of their number is occurring.

Figure 3:
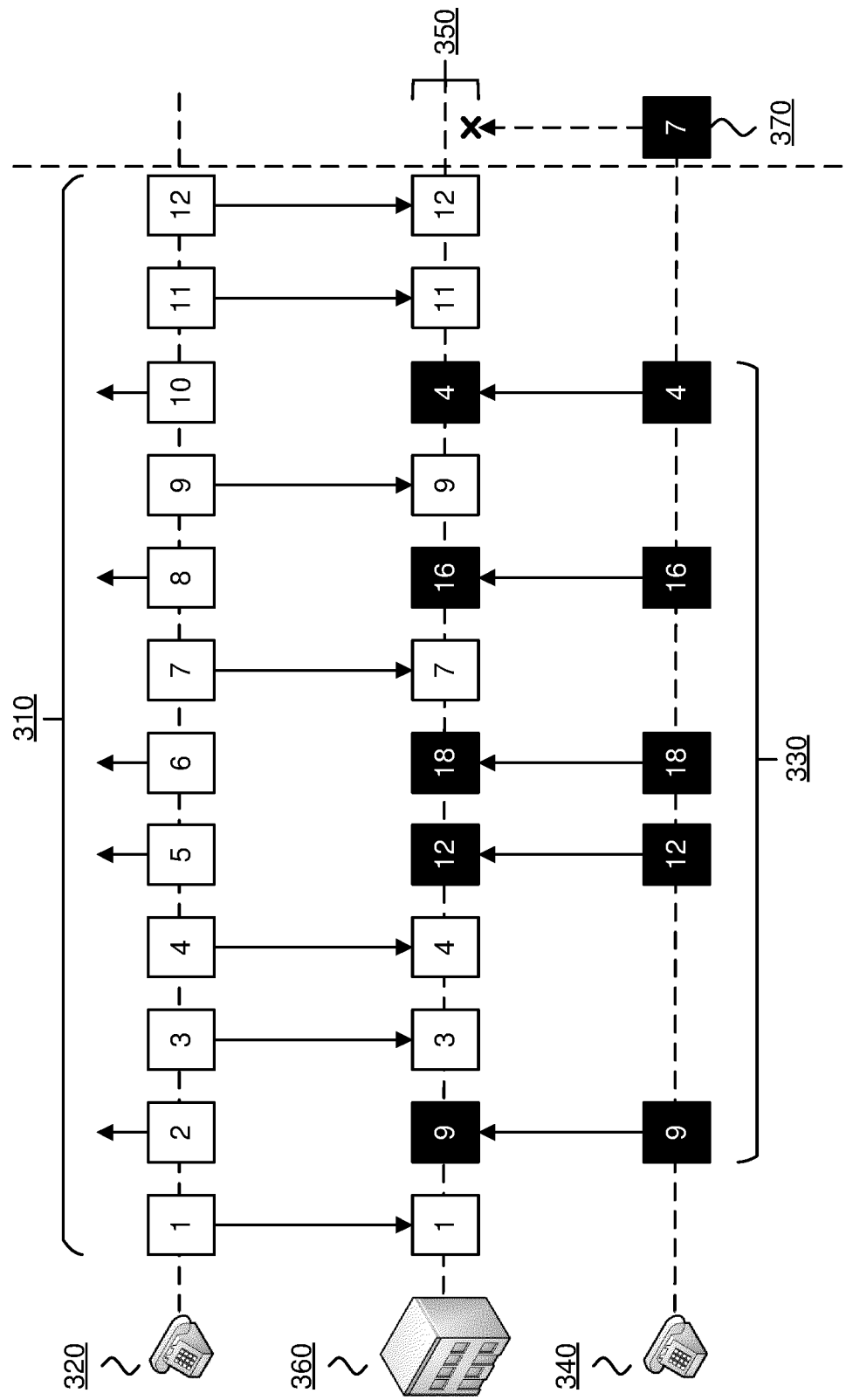
FIG. 3 schematically illustrates exemplary sequences of calls being placed within a telephone network in accordance with embodiments of the invention.

FIG. 3 is a schematic illustration of exemplary sequences of calls being placed within a telephone network, such as the telephone network 100, in accordance with embodiments of the invention. Specifically, FIG. 3 illustrates a sequence of calls 310 which is made by a first party 320, a sequence of calls 330 which is made by a second party 340, and the resulting sequence of calls 350 which is seen by an operator 360 of the network 100.

The first party 320 is the owner or authorised user of a particular telephone number. The first party 320, places calls in a particular order in accordance with the present invention. As discussed above, in some embodiments, this may simply involve the first party making calls in an order that is widely published by the network operator 360, such as for example, by making calls in an ascending (or descending) numerical order of the number that is dialled. In other embodiments, the first party 320 may share a secret with the network operator 360. That is to say, the first party 320 may provide a secret to the network operator 360 or, alternatively, may receive a secret from the network operator 360. As discussed above, this secret enables a predetermined order for calling a set of telephone numbers to be generated. In any case, the first party 320 determines what a correct order for calling a particular set of numbers that it intends to call is (according to the predetermined order) and places calls 310 to those numbers in that order.

The second party 340 illustrated in FIG. 3 is a party that is engaged in spoofing the particular telephone number belonging to the first party 320. That is to say, the second party 340 is placing calls 330 which specify the caller ID and/or originating number as being the particular telephone number owned by the first party 320 despite the fact that the second party 340 is not authorised to use the particular telephone number.

The operator 360 of a telephone network 100 through which some of the calls are processed is unlikely to see all of the calls that are made by the first party 320 or the second party 340. This is because, either the first party 320 or the second party 340, or both, may belong to a different network than the telephone network 100 that is outside the control of the operator 360. Similarly, some of the numbers called by the first party 320 or the second part 340 or both may also be outside of the telephone network 100. Accordingly, the operator 360 may only be aware of those calls which are made to numbers within the telephone network 100 (and not other calls that are placed to numbers belonging to other networks). Therefore, the sequence of calls 350 represents the amalgamation of calls 310 placed by the first party 320 and calls 330 placed by the second party 340 as seen by the operator 360. As can be seen, this amalgamated sequence of calls 350 that is seen by the operator 360 does not include the $2^{nd}$, $5^{th}$, $6^{th}$, $8^{th}$ or $10^{th}$ calls in the sequence of calls 310 made by the first party 320, as these calls represent calls being made to other numbers that are not part of the telephone network 100 operated by the operator 360. Similarly, other calls 330 may be placed by the second party to numbers that are not part of the telephone network 100 and these too will be absent from the amalgamated sequence of calls 350 that is seen by the operator 360. Nonetheless, the operator 360 can still apply the method 200 to determine whether the sequence of calls 350 includes any spoofed calls. That is to say, by applying method 200, the operator 360 can detect the existence of the second party 340 that is making unauthorised use of the particular telephone number. Specifically, when considering the sequence of calls 350 which represent the calls made from the particular telephone number from the operator's perspective, the operator can ascertain that the sequence of calls 350 is not correctly ordered (that is, it does not correspond to a predetermined order that the calls should have been made in). This is evident after the first three calls, which are to telephone numbers which should appear in positions 1, 9 and 3 of the predetermined order for those telephone numbers. However, since the telephone number in the $9^{th}$ position of the predetermined order has been called before the $3^{rd}$ number of the predetermined order (where a correct order would be for the telephone number in the $9^{th}$ position to be called after the telephone number in the $3^{rd}$ position), the operator 360 can safely conclude that spoofing is occurring for this particular telephone number. It is worth noting, for completeness, that it would not be possible for the operator 360 to ascertain the presence of spoofing after just the first two calls (in this particular case). This is because, in the example illustrated by FIG. 3, the first call is to the telephone number in the $1^{st}$ position of the predetermined order and the second call is to the telephone number in the $9^{th}$ position of the predetermined order and therefore the order of these two calls is correct according to the predetermined order. Although at this point the operator is not aware of calls being made to the numbers in positions 2-8 of the predetermined order, the operator can only assume that either the first party did not want to call these telephone numbers, or else that calls to these numbers utilised other networks, or some combination of the two. As will be appreciated, there are many different permutations of calls that can be made that maintain a correct ordering of the calls based on the predetermined ordering of the telephone numbers—all that is required for the order to be correct is that a number earlier in the predetermined order is not called after a number which is later in the predetermined order. Nonetheless, since the second party 340 does not know about the calls 310 that are being made by the first party 320, it will be hard, if not impossible, for them to make calls in such a way that the correct ordering of the calls is maintained so as to avoid detection, even if the required ordering is known by the second party 340. Of course, the chances of the second party 340 avoiding detection are likely to be even lower when the required ordering is based on a secret shared between the network 100 and the first party 320, which is not known to the second party 340.

It will be appreciated that the example of FIG. 3, as discussed above, has been simplified in order to more clearly illustrate the invention. For example, in reality, there could be additional parties making additional spoofed calls. Such additional spoofed calls would largely be viewed the same from the network operator's perspective and simply appear as additional calls in the amalgamated sequence of calls 350 that is seen by the operator 360. Additionally, it will be appreciated that it is merely coincidental that the genuine calls 310 made by the first party 320 occupy the same number slot in the sequence observed by the operator 360 as their order in the predetermined sequence (i.e. that call 1 in the sequence of calls made by the first party occupies the $1^{st}$ position in the sequence observed by the operator and that call 3 occupies the $3^{rd}$ position and so on). This need not be the case (and indeed, is unlikely to be so). For example, if the second party 340 had made an additional call between the $1^{st}$ and $3^{rd}$ calls made by the first party 320, the $3^{rd}$ call made by the first party 320 would occupy the $4^{th}$ position in the sequence 350 observed by the operator 360 instead.

The exemplary sequences of calls illustrated in FIG. 3 will now be discussed further in conjunction with FIG. 4 which is a flowchart illustrating a method 400 of processing calls in a telephone network, such as telephone network 100, according to embodiments of the invention. This method is a development of the method 200 illustrated in FIG. 2. In particular, the method 400 illustrated by FIG. 4 additionally classifies each of the calls that are made using the particular number as being either genuine or spoofed, to allow further action to be taken in respect of the spoofed calls.

As discussed above for the method 200 illustrated in FIG. 2, the method 400 can begin with the optional operation 210 of sharing a secret with the owner or authorised user of a particular telephone number. The method 400 then proceeds to an operation 220, which is also as discussed above in relation to the method 200 illustrated in FIG. 2. As previously discussed, in some embodiments, the method 400 may skip optional operation 210 and begin instead with operation 220 (for example, where the operator 360 widely publishes a technique for determining an ordering of making calls that is not specific to any one telephone number). Either way, after identifying previous calls that were ostensibly made using the particular telephone number (from the network operator's perspective) at operation 220, the method 400 then proceeds to an operation 410.

At operation 410, the method 400 identifies a largest subset of the plurality of calls that were made using the particular telephone number which provide a sequence of calls having a correct order according to the predetermined order for calling numbers. Appendix A below shows exemplary code using the Julia programming language which can be used to identify this largest subset.

For illustration, some examples subsets of the plurality of calls which have a correct order for the exemplary calling sequences illustrated in FIG. 3 are set out in the table below.

| Subset of Calls | Correct Sequence | Subset Size |
| --- | --- | --- |
| $1^{st}$, $2^{nd}$, $5^{th}$, $6^{th}$ | 1, 9, 12, 18 | 4 |
| $1^{st}$, $2^{nd}$, $5^{th}$, $8^{th}$ | 1, 9, 12, 16 | 4 |
| $1^{st}$, $2^{nd}/9^{th}$, $11^{th}$, $12^{th}$ | 1, 9, 11, 12 | 4 |
| $1^{st}$, $3^{rd}$, $4^{th}$, $5^{th}$, $6^{th}$ | 1, 3, 4, 12, 18 | 5 |
| $1^{st}$, $3^{rd}$, $4^{th}$, $5^{th}$, $8^{th}$ | 1, 3, 4, 12, 16 | 5 |
| $1^{st}$, $3^{rd}$, $4^{th}$, $6^{th}$ | 1, 3, 4, 18 | 4 |
| $1^{st}$, $3^{rd}$, $4^{th}$, $7^{th}$, $8^{th}$ | 1, 3, 4, 7, 16 | 5 |
| $1^{st}$, $3^{rd}$, $4^{th}$, $7^{th}$, $9^{th}$, $11^{th}$, $12^{th}$ | 1, 3, 4, 7, 9, 11, 12 | 7 |
| $1^{st}$, $3^{rd}$, $5^{th}$, $6^{th}$ | 1, 3, 12, 18 | 4 |
| $1^{st}$, $3^{rd}$, $5^{th}$, $8^{th}$ | 1, 3, 12, 16 | 4 |
| $1^{st}$, $3^{rd}$, $8^{th}$ | 1, 3, 16 | 3 |

As can be seen, the largest subset which provides a correct order of calls is the subset containing the $1^{st}$, $3^{rd}$, $4^{th}$, $7^{th}$, $9^{th}$, $11^{th}$ or $12^{th}$ calls in the sequence of observed by the operator 360. Having identified the largest subset of the plurality of calls, the method 400 proceeds to an operation 420.

At operation 420, the method 400 classifies any calls belonging to the largest subset as being legitimate calls and any calls not belonging to the largest subset as being spoofed calls. Returning to the largest subset identified in the example illustrated in FIG. 3, it can be seen that this largest subset contains all of the calls which were made by the first (genuine) party 320 and none of the spoofed calls made by the second (unauthorised) party 340. Accordingly, the spoofed calls can be identified as being any calls not contained in this largest subset (i.e. the $2^{nd}$, $5^{th}$, $6^{th}$, $8^{th}$ and $10^{th}$ calls).

Figure 4:
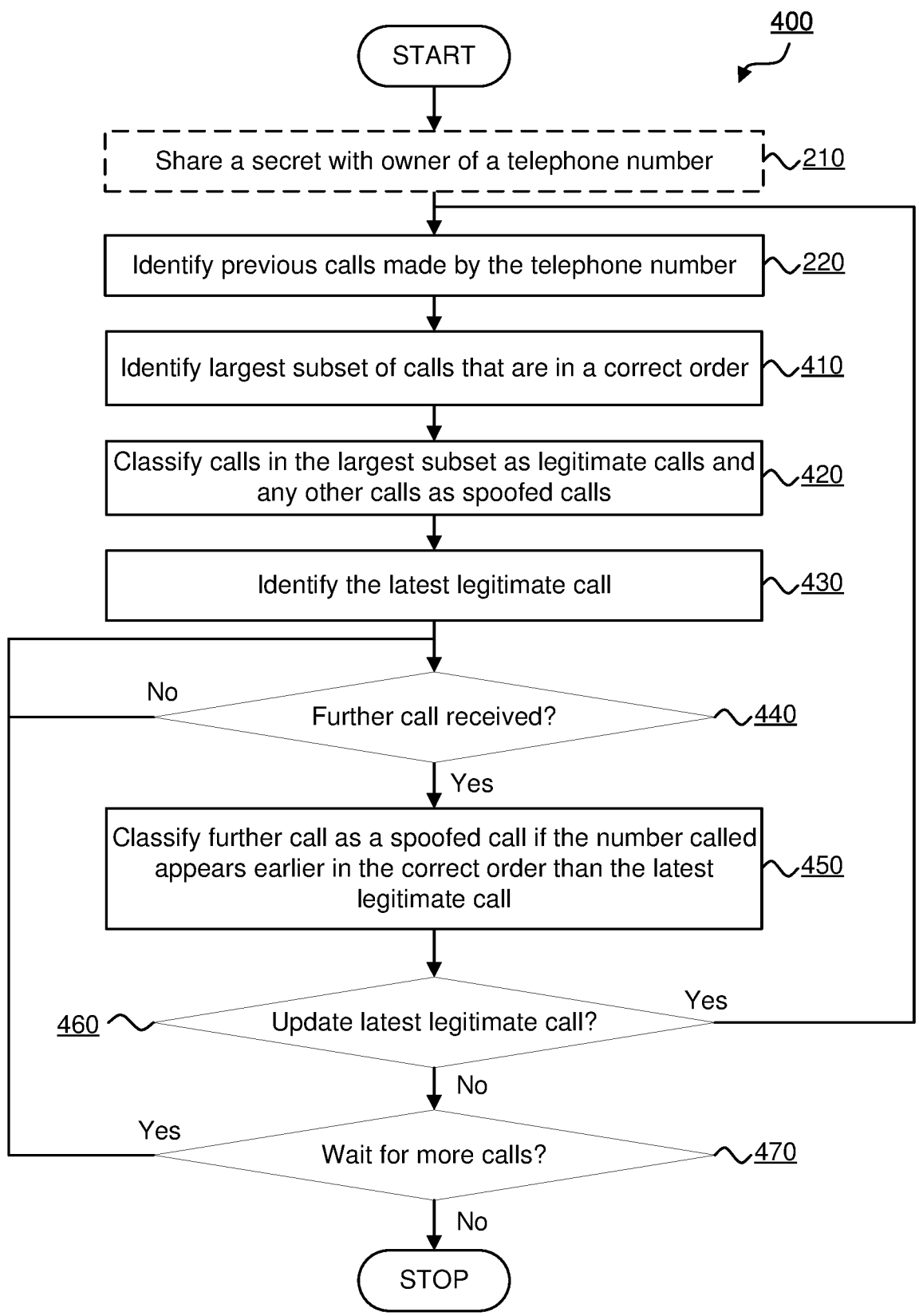
FIG. 4 is a flowchart illustrating a method of processing calls in a telephone network according to embodiments of the invention.

Although not shown in FIG. 4, the method 400 may optionally make use of this information regarding spoofed calls which have recently been made using a particular telephone number to take action to help mitigate some of the potential negative impact that those calls might have. For example, in some embodiments, the owner or authorised user of the particular telephone number may be notified of spoofed calls that have recently been made using their telephone number. This can allow the owner of the telephone number to contact any of their customers who may have been affected or more closely monitor accounts associated with those customers to help prevent any fraudulent activity. Other uses for this information will be readily apparent to the skilled person.

Where classification of past calls is the only concern, the method 400 may simply end at this point (not shown), possibly to be repeated after a certain amount of time has elapsed so as to provide updated information. However, as will be discussed below, the classification of these calls in operation 420 can also be used to block at least some of the spoofed calls that could be made by the second (or indeed any other) party 340 in the future. Accordingly, the method 400 preferably proceeds to an operation 430.

At operation 430, the method 400 identifies the latest legitimate call. The latest legitimate call is the call in the largest subset of numbers that was identified at operation 410 which was placed most recently. In the exemplary call sequences illustrated in FIG. 3, the most recent call is the $12^{th}$ call which is to the telephone number that is ordered $12^{th}$ in the predetermined ordering of telephone numbers. Having identified the latest legitimate call, the method 400 proceeds to an operation 440.

At operation 440, the method 400 waits for any further calls to be made using the particular telephone number under consideration. In the example illustrated by FIG. 3, the second user 340 places a new spoofed call to the telephone number that is $7^{th}$ in the predetermined ordering of telephone numbers. When a new call is placed to a telephone number that is on the operator's network 100, the method 400 proceeds to an operation 450.

At operation 450, the method 400 classifies the further call made by the particular telephone number as a spoofed call if a telephone number that is called is earlier in the predetermined order than the latest legitimate call. In particular, it will be appreciated that the latest legitimate call effectively sets a bound on the numbers that can be called by any future genuine calls. Specifically, any subsequent calls that are made by the first (genuine) user 320 will only be to numbers that appear later in the ordering of the set of numbers than the latest legitimate call. Therefore, if a call is made to a number that appears earlier in the ordering of the set of numbers, it can safely be concluded that that call is a spoofed call. In the example illustrated in FIG. 3, any genuine further calls can only be to numbers that are in position 13 or higher of the predetermined order as the latest legitimate call was to the $12^{th}$ number in the predetermined order. In some embodiments, any further calls which are classified as spoofed calls in this way are blocked, preventing the call from reaching the destination number. Of course, any desired way of handling further calls which are classified as being spoofed may be used, including for example, directing the spoofed calls to a voicemail service for the destination number and providing a warning to a user of the destination number to exercise caution due to the fact that the voicemail came from a spoofed number (conceptually similar to a junk e-mail folder for voicemail) or alerting the operator of the network that a spoofed call is in progress Alternatively or additionally, the method 400 can notify the network from which the spoofed calls originated that the calls have been identified as using a spoofed Caller ID, this enables the originating network to take various actions to help rectify the spoof calling including, for example, ceasing to propagate Caller IDs for that number to the network 100.

In the example illustrated by FIG. 3, the second user's new spoofed call is classified as a spoofed call and blocked from reaching the destination number because the destination number appears earlier ($7^{th}$) in the predetermined order of telephone numbers than the latest legitimate call (which is $12^{th}$). The method 400 then proceeds to an operation 460.

At operation 460, the method 400 determines whether the call that has been identified as the latest legitimate call should be updated. In particular, although it is safe to conclude that a call made to a number that appears earlier in the ordering of the set of numbers than the latest legitimate call is a spoofed call, the same is not true in reverse. In other words, a further call to a number which appears later in the order of the set of numbers than the latest legitimate call is not necessarily a genuine call—it could still be a spoofed call. Accordingly, the method 400 may regularly occasionally return to operation 220 to recalculate the latest legitimate call by analysing an updated set of calls placed from the particular number under consideration. For example, the processing to identify the latest legitimate call can be conducted periodically or after a certain number of further calls have been made. Of course, in some embodiments, the latest legitimate call can simply be calculated once, that is to say, the method 400 may omit operation 460. In such embodiments, it is still likely that a proportion of further spoofed calls can be identified and dealt with even though the proportion could be improved by refining the bound for later calls, through the identification of a later legitimate call. The method 400 then proceeds to an operation 470.

At operation 470, the method 400 determines whether it should continue waiting for further calls to be made, in which case the method 400 returns to operation 440. Otherwise, the method 400 ends. The determination to end the method 400 could be based, for example, on notification by the first party 320 that they do not wish the network 100 to monitor their telephone number for spoofing any more—possibly, for example, when a calling campaign has ended. As a further example, the method could end after a certain amount of time has elapsed. In this case, the method could be restarted again, possibly using a new secret or otherwise allowing for a reset in the observed sequences to occur. Of course in other examples, the method 400 may simply be run sporadically such as at the request of the owner of the telephone number. In this case, the owner of the telephone number may generate a secret and place the calls according to the order determined by the secret and then, only after the calls have been made, provide the secret to the network and ask the network to check whether any spoof calls were made during a particular time period. Whilst this would prevent the network from being able to detect spoof calls as they are being made, it provides a mechanism by which the owner of a telephone number can opt to use the service on an ad-hoc basis where they have suspicions that spoofing of their number has taken place.

The methods 200 and 400 discussed above make use of the likelihood of a spoofed call appearing in a correct order compared to other calls that have been made using a particular number being low, thereby providing a high probability that spoofed calls will be detected.

Given a range r of numbers of numbers being dialed by the first (genuine) party 320 and an average interval i (that is the average encoded gap or the distance between the telephone numbers in the predetermined order) between numbers in that range which are dialed by the first party 320, then the probability p of a spoofed call being successfully inserted (i.e. such that it is in the correct order and thereby avoids detection) by the second party 340 can be considered to be:

$$p = \frac{i}{r}$$

If the second party 340 makes n spoofed calls, the probability p of at least one of those being successfully inserted (i.e. such that it escapes detection) can be considered to be:

$$p = n \times \frac{i}{r}$$

Therefore, in a sequence of k genuine calls made by the first party 320, the probability p of a successful insertion in that sequence can be considered to be:

$$p = k \times \left( n \times \frac{i}{r} \right)$$

Accordingly, the ratio of genuine calls to (undetected) spoofed calls can be considered to be:

$$\frac{k \times \left( n \times \frac{i}{r} \right)}{k}$$

The worst case performance will be seen when the number spoof calls significantly outnumber genuine calls being made by the owner or authorised user of a particular number. In reality, this is rare because spoof callers are typically wary of drawing too much attention to their activities by generating too many spoofed calls and possibly also because doing so could limit the effectiveness of their activities by raising awareness in the minds of users that calls are likely to be spoofed. However, even under these unlikely worst case operating conditions, these methods are likely to detect at least some of the spoofed calls that are being made.

In experiments, a probability of spotting a single spoofed call was determined to be approximately 0.36 where a ratio of genuine calls to spoofed calls of 1:10 (which is expected to be an untypically high ratio). Using this minimum observed probability, the binomial distribution can be used to calculate the probability of failing to spot any spoofed calls for a given number n of spoofed calls. As will be known, the binomial distribution is given as:

$$P(k) = \binom{n}{k} p^k q^{n-k}$$

where p is the probability of success, q is the probability of failure (i.e. q=p−1) and k is the number of successes in n trials. In this case, the probability of success p is the probability of spotting a spoofed call. A failure to spot any of the spoofed calls is therefore given by P(0), i.e.:

$$P(0) = \binom{n}{0} p^0 q^{n-0} = q^n$$

Figure 5:
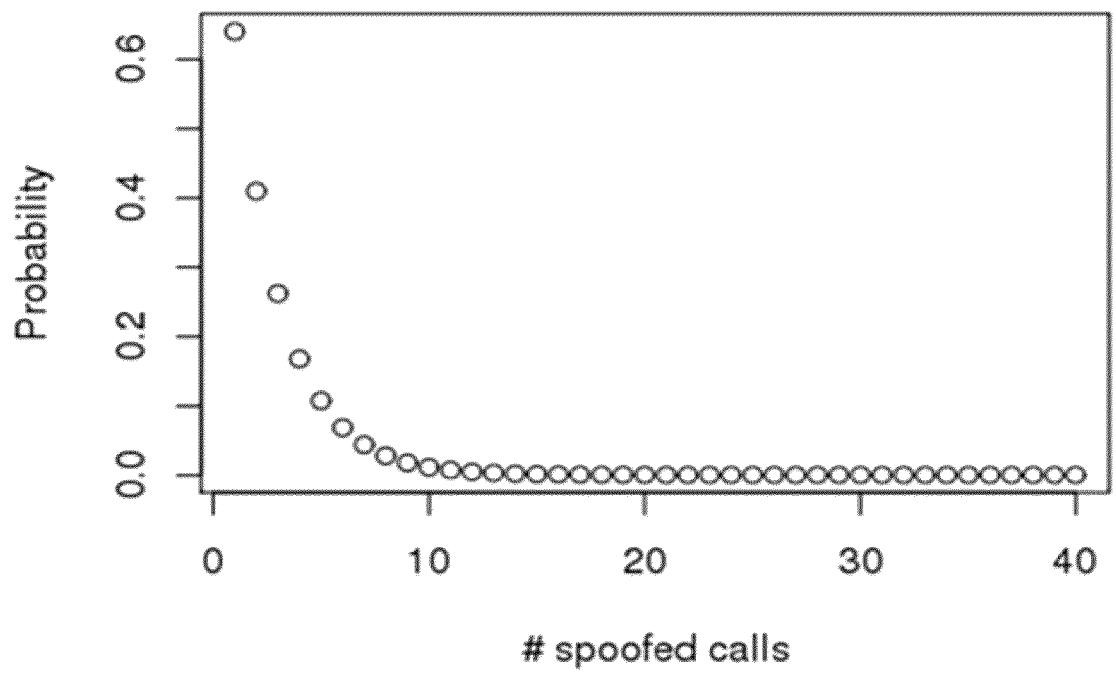
FIG. 5 shows a chart illustrating the probability of failing to spot any of the spoofed calls as the number of calls increases based on a minimum probability of spotting a single spoofed call observed during experiments.

FIG. 5 shows a chart illustrating the probability of failing to spot any of the spoofed calls as the number of calls increases based on a minimum probability of spotting a single spoofed call observed during experiments. As is apparent, the probability P(0) of failing to spot any of the spoofed calls will decrease as the number of spoofed calls n increases. Therefore, even at this minimum probability of spotting a single spoofed call of 0.36, the probability of missing 20 spoofed calls, for example, is 0.0001329228. Bearing in mind that this minimum probability requires a high ratio of spoofed calls to genuine calls, such that the number of spoofed calls is likely to be high, the probability of detecting that spoofing is taking place is high, even in this scenario.

Accordingly, by allowing the presence of spoofed calls for a telephone number to be detected, the above-described methods enable an identity of an owner or authorised user of the telephone number to be better asserted on the voice network. These methods may also allow some of the spoofed calls to be screened, reducing a load on the network and potentially reducing fraud or the impact of any denial of service attacks utilising spoofed Caller IDs. Furthermore, these methods can operate using customers' existing telephone equipment and do not require the receiving customers (that is the numbers which are called by an owner of a telephone number or a spoof caller) to adapt in any way in order to provide these benefits. Additionally, these methods can be used by a network operator without needing to introduce any new in-network signalling systems.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference

APPENDIX A

Exemplary Function in Julia to Reconstruct
Longest Descending Sequence (LDS)

```
function lds(arr::Vector)
    if length(arr) == 0
                return copy(arr)
    end
    listA = Vector{typeof(arr)}(length(arr))
    listA[1] = [arr[1]]
    for i in 2:length(arr)
        nextL = [ ]
        for j in 1:i
            if arr[j] > arr[i] && length(listA[j]) ≥ length(nextL)
                nextL = listA[j]
            end
        end
        listA[i] = vcat(nextL, arr[i])
    end
    return listA[indmax(length.(listA))]
end
```

The invention claimed is:

1. A computer-implemented method of processing calls in a telephone network, the method comprising:
identifying a plurality of calls that have been made by a particular telephone number to telephone numbers in the telephone network;
determining whether a sequence in which the calls were placed corresponds to a correct order for calling those telephone numbers, the correct order being determined based on a predetermined order for calling telephone numbers in the telephone network; and
determining that one or more of the calls were made by spoofing the particular telephone number if the sequence in which the calls were placed does not correspond to a correct order.

2. The method of claim 1, wherein the method further comprises:
identifying a largest subset of the plurality of calls for which a sequence in which the subset of calls was placed corresponds to a correct order for calling those telephone numbers; and
classifying any calls belonging to the largest subset as being legitimate calls and any calls not belonging to the largest subset as being spoofed calls.

3. The method of claim 2, wherein the method further comprises:
identifying the latest legitimate call; and
classifying a further call made by the particular telephone number as a spoofed call if a telephone number that is called is earlier in the predetermined order than a telephone number of the latest legitimate call.

4. The method of claim 3, wherein the method further comprises:
blocking the further call in response to classifying the further call as a spoofed call.

5. The method of claim 1, wherein the method further comprises:
sharing a secret with a party that is authorised to use the particular telephone number, the secret determining the predetermined order for calling a set of telephone numbers.

6. The method of claim 5, wherein sharing the secret with the party that is authorised to use the particular telephone number comprises receiving the secret from the party.

7. The method of claim 5, wherein sharing the secret with the party that is authorised to use the particular telephone number comprises providing the secret to the party.

8. The method of claim 5, wherein the secret comprises an operation that produces a numerical value from a telephone number, and wherein the predetermined order is based on the respective numerical values produced by the operation for each of the called telephone numbers.

9. The method of claim 8, wherein the predetermined order is generated by placing the respective numerical values for each of the called telephone numbers in either ascending or descending order.

10. The method of claim 5, wherein the secret comprises a cipher or a hashing function.

11. The method of claim 1, wherein the method further comprises:
causing one or more predetermined actions to be taken in response to determining that one or more of the calls were made by spoofing the particular telephone number.

12. The method of claim 11, wherein the one or more predetermined actions comprise:
notifying the party which is authorised to use the particular telephone number that calls are being made by spoofing that telephone number.

13. A computer system for processing calls in a telephone network, the computer system comprising a processor and a memory storing computer program code which is executable by the processor such that computer system is configured to at least:
identify a plurality of all calls that have been made by a particular telephone number to telephone numbers in the telephone network;
determine whether a sequence in which the calls were placed corresponds to a correct order for calling those telephone numbers, the correct order being determined based on a predetermined order for calling telephone numbers in the telephone network; and
determine that one or more of the calls were made by spoofing the particular telephone number if the sequence in which the calls were placed does not correspond to a correct order.

14. The computer system of claim 13, wherein the computer system is further configured to:
identify a largest subset of the plurality of calls for which a sequence in which the subset of calls was placed corresponds to a correct order for calling those telephone numbers; and
classify any calls belonging to the largest subset as being legitimate calls and any calls not belonging to the largest subset as being spoofed calls.

15. The computer system of claim 14, wherein the computer system is further configured to:
identify the latest legitimate call;
classify a further call made by the particular telephone number as a spoofed call if a telephone number that is called is earlier in the predetermined order than a telephone number of the latest legitimate call; and
block the further call in response to classifying the further call as a spoofed call.

16. The computer system of claim 13, wherein the computer system is further configured to:

share a secret with a party that is authorised to use the particular telephone number, the secret determining the predetermined order for calling a set of telephone numbers.

17. The computer system of claim 16, wherein the secret comprises an operation that produces a numerical value from a telephone number, and wherein the predetermined order is based on the respective numerical values produced by the operation for each of the called telephone numbers.

18. The computer system of claim 17, wherein the predetermined order is generated by placing the respective numerical values for each of the called telephone numbers in either ascending or descending order.

19. The computer system of claim 13, wherein the computer system is further configured to:
   cause one or more predetermined actions to be taken in response to determining that one or more of the calls were made by spoofing the particular telephone number;
   wherein the one or more predetermined actions comprise: notifying the party which is authorised to use the particular telephone number that calls are being made by spoofing that telephone number.

20. A non-transitory computer-readable storage medium storing a computer program which, when executed by one or more processors, is arranged to carry out a method of processing calls in a telephone network, the method comprising:
   identifying a plurality of calls that have been made by a particular telephone number to telephone numbers in the telephone network;
   determining whether a sequence in which the calls were placed corresponds to a correct order for calling those telephone numbers, the correct order being determined based on a predetermined order for calling telephone numbers in the telephone network; and
   determining that one or more of the calls were made by spoofing the particular telephone number if the sequence in which the calls were placed does not correspond to a correct order.

* * * * *